Figure 1:
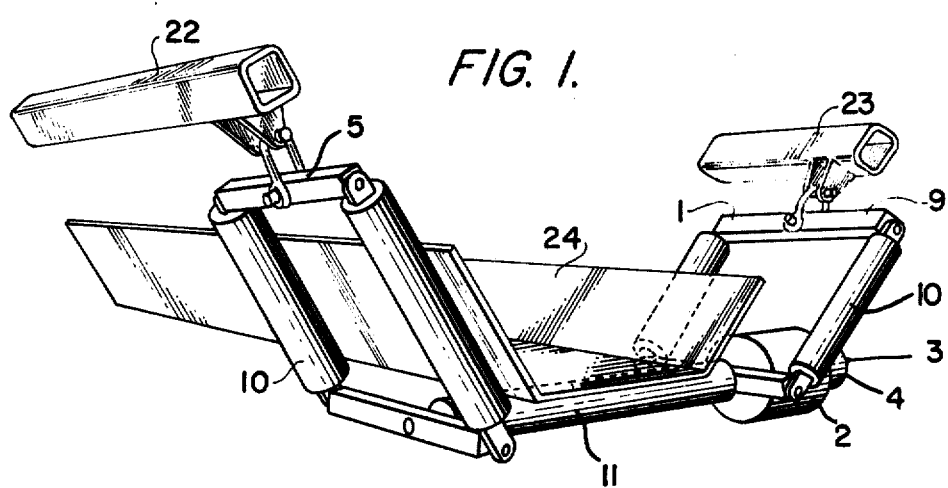

United States Patent
Fischer et al.

[11] 3,880,275
[45] Apr. 29, 1975

[54] TROUGH BELT CONVEYOR

[76] Inventors: Hans Fischer, In der Rosenau 15, D 5 Cologne-Zundorf; Heinrich Schindler, Geraer Platz 7, D 5 Cologne 80, both of Germany

[22] Filed: Apr. 20, 1973

[21] Appl. No.: 353,066

[52] U.S. Cl. ............................. 198/192 R; 198/191
[51] Int. Cl. .............................................. B65g 15/08
[58] Field of Search ............ 198/192, 192 A, 127 E, 198/191

[56] References Cited
UNITED STATES PATENTS

| | | |
|---|---|---|
| 2,608,286 | 8/1952 | Henschker ..................... 198/127 E |
| 3,643,797 | 2/1972 | Diantonio ....................... 198/192 R |

*Primary Examiner*—Richard A. Schacher
*Assistant Examiner*—Jeffrey V. Nase
*Attorney, Agent, or Firm*—Karl W. Flocks

[57] ABSTRACT

A U-shaped carrier in a trough belt conveyor comprises carrier roller means, drive motor means connected to said carrier roller means and operable to drive the same and produce a reaction torque, and side roller means connected to said carrier roller means at both ends thereof. The carrier is provided with reaction torque-resisting means for taking up said reaction torque.

7 Claims, 5 Drawing Figures

PATENTED APR 29 1975 3,880,275

PATENTED APR 29 1975

3,880,275

SHEET 2 OF 2

TROUGH BELT CONVEYOR

This invention relates to a trough belt conveyor, particularly to a large-size belt conveyor which comprises U-shaped carriers that include carrier rollers and are spaced predetermined distances apart.

Belt conveyors, particularly large-size belt conveyors, must compete with conventional transportation equipment such as railroads, trucks and pipelines. Two main trends of development can be recognized: There is a progressive increase in handling rates and volumes resulting in progressively wider belts and deeper troughs whereas the velocities remain approximately constant. There is also a trend towards a handling over larger distances by increasing the length of the conveyors. Both trends involve a progressive increase in driving power. In a conventional design, however, only limited forces can be transmitted to the belt because the drive units cannot be increased in size indefinitely and the belt can no longer cope with the larger forces which are applied to the belt as the driving power increases. The problem has been explained by Professor Dr.-Ing. Bahke as follows: "The high handling rates do not only require a belt having a higher tensile strength but also require a frictional transmission of higher power to the belt. There are physical and structural limits to these trends, and these limits may be defined as follows: Belt strength: Belts having tensile strengths up to 20,000 kilograms per centimeter can be manufactured and used. Belts are now being made in widths up to 3,600 millimeters. The increase in width results in a highly irregular distribution of the tensile force which can be transmitted so that a higher margin of safety is required."

"When a power up to 1,500 kW is to be transmitted, the overall dimensions and weights of the means used to drive the belt, such as the drum, clutch, and brake, are within tolerable limits. Higher power involves difficulties in construction, for instance, in the transportation and installation of the subassemblies which are heavy and bulky. Because the power is increased in large steps, the pantograph principle cannot be adopted and the storage of spare parts and the assembling equipment involve high expenditures."

Partial solutions have been disclosed in this connection:

For instance, the German Pat. No. 1,189,450 discloses a decentralized drive system in a belt conveyor which conveyor is provided with independent, individual intermediate drive units driven by individual motors.

The Opened German application No. 1,950,169 describes an arrangement for driving a conveyor belt, preferably a rubber belt, by means of successive intermediate drive units, which are provided with revolving elements. In that arrangement, the revolving elements adjacent to each intermediate drive unit carry the entire load of the conveyor belt course. The coefficient of friction between the revolving elements and the conveyor belt should not substantially exceed the value which is required for the drive of each conveyor belt portion by the associated intermediate drive unit.

It is also known from the German Pat. Nos. 491,860 and 819,063 to use driven carrier rollers and electrically driven rollers, respectively, but these proposals have not afforded a solution to such a complex problem as is involved in a handling of more than 300,000 cubic meters of coarse, heavy material (overburden from a bucket wheel excavator) per day or in a transformation at high rates over hundreds of miles.

It is an object of the invention to provide a trough belt conveyor which comprises U-shaped carriers and is particularly intended for high handling rates and/or for handling material in a stream that is large in cross-section and/or for a handling over large distances.

This is accomplished according to the invention in that the U-shaped carriers comprise side rollers and independently driven intermediate or central carrier rollers and rockers consisting of pairs of rollers which bear on the conveyor belt are provided to take up the reaction torque of the motors.

In one embodiment of the invention, the intermediate or central carrier rollers are driven by plugged-on motors known per se.

In a modification of the invention, the intermediate or central carrier rollers consist in known manner of drum motors.

It will be desirable to associate with each motor a brake, which is preferably mounted on the free shaft end of the motor.

This permits of a variation of the geometric configuration of the trough belt conveyor; the U-shaped carriers can be adapted to the stream of material to be handled and they are relatively insensitive to dynamic actions of the material handled and to shocks imposed by large pieces being handled.

The use of driven intermediate or central rollers as rollers carrying the main load enables a continuous handling of bulk material even in streams which are particularly large in cross-section and over long distances, as an alternative to the transportation by railroad, trucks or similar discontinuous transportation equipment.

Figure 2:
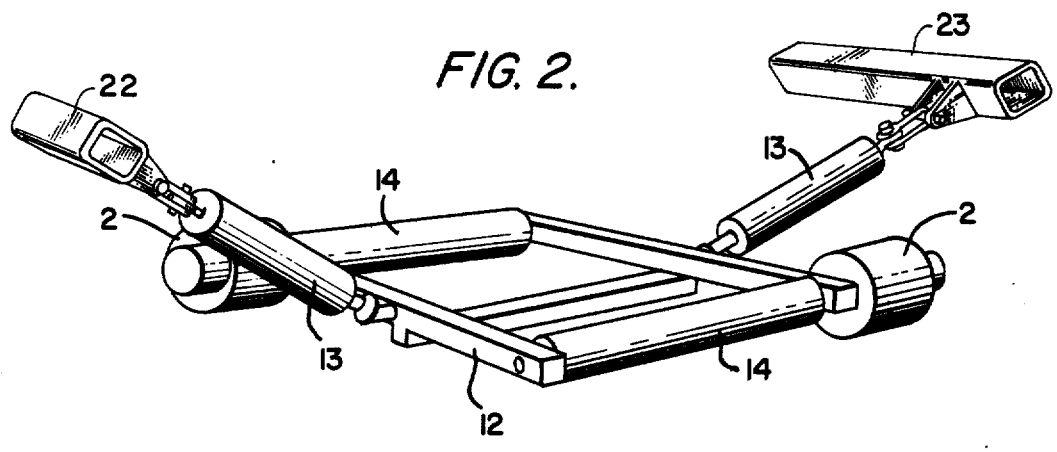
Figure 3:
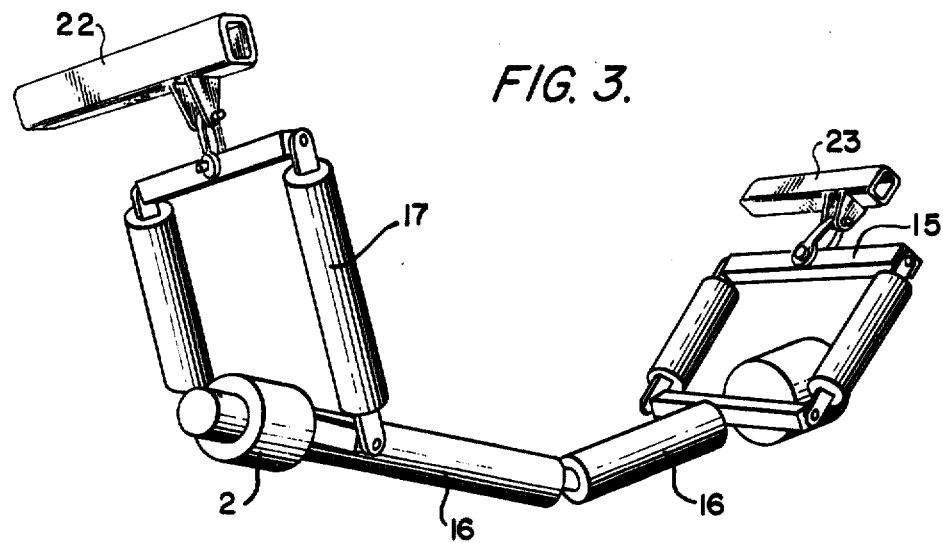
Figure 4:
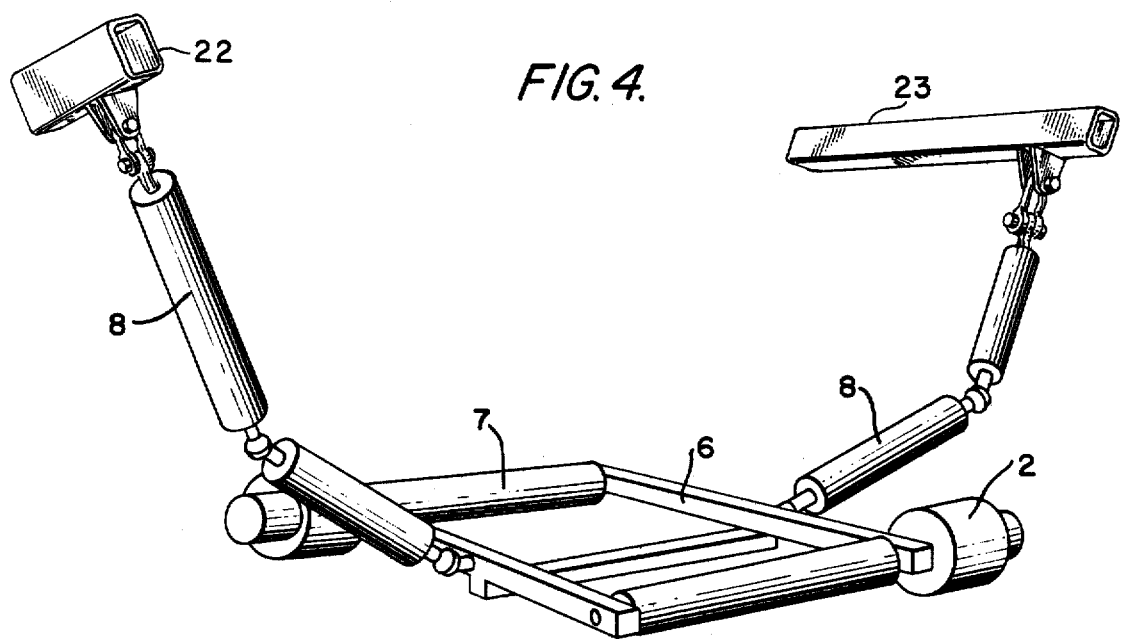
Figure 5:
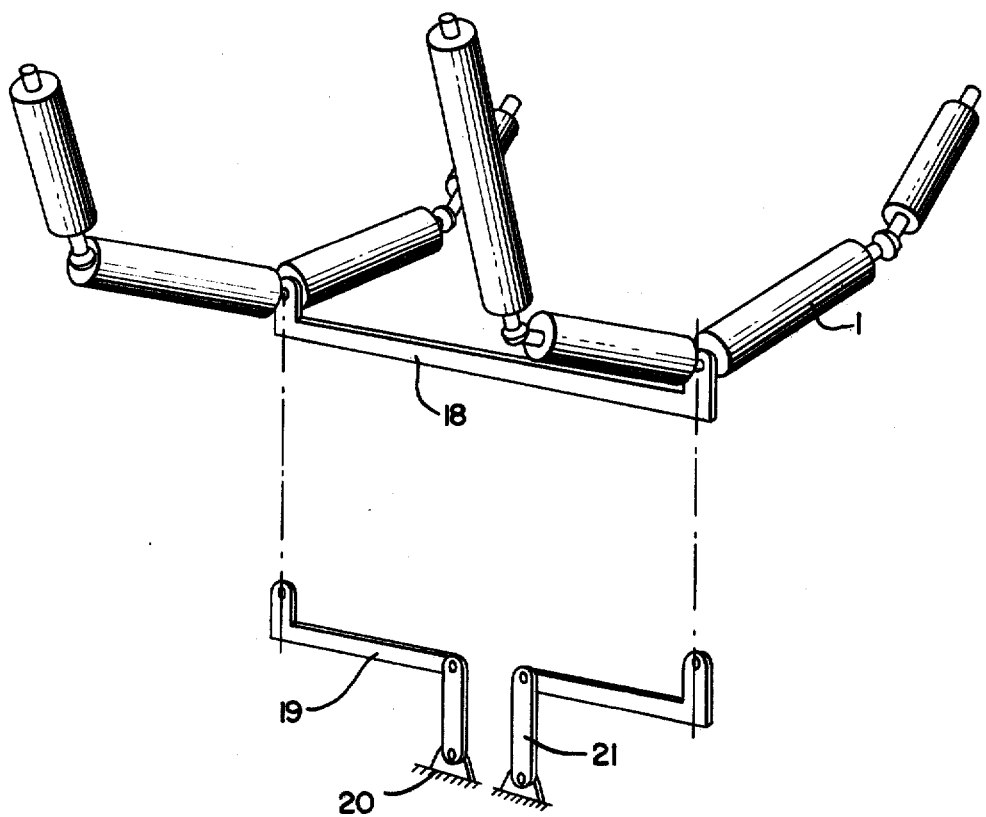

Further advantages and features of the invention will become apparent from the following description of several embodiments shown by way of example on the drawings, which show in perspective views in FIG. 1 a three-part U-shaped carrier comprising a driven carrier roller, in FIG. 2 a three-part U-shaped carrier comprising two driven carrier rollers, which are combined in a rocker, in FIG. 3 a four-part U-shaped carrier, in FIG. 4 a five-part U-shaped carrier, and in FIG. 5 a interconnection between two U-shaped carriers.

The trough belt conveyor 24 is provided with U-shaped carriers 1 spaced predetermined distances apart.

The embodiment of the invention shown in FIG. 1 comprises three-part U-shaped carriers. The side rollers 10 are connected to an independently driven, intermediate carrier roller 11, with which a laterally mounted plugged-on motor 2 is associated. Alternatively, the roller 11 itself may consist of a drum motor.

Brakes 4 are preferably mounted on the free shaft ends 3 laterally of the plugged-on motors. To take up the reaction torque of the motors, the side rollers 10, which are arranged in pairs, form rockers 5, 9 which bear on the conveyor belt 24. Supports 22, 23 are connected to rockers 5, 9 in FIG. 1 and extend along the conveyor to provide support for the U-shaped carriers carrying a conveyor belt 24 along the path of the conveyor.

FIG. 2 shows an embodiment of the invention in which the U-shaped carriers consist of three parts. The driven intermediate carrier rollers 14 comprise a pair of horizontal rollers, which constitute a rocker 12 and connect the side rollers 13. Here supports 22, 23 are connected to the outer ends of rollers 13 for support of U-shaped carriers along the path of the conveyor. Similar supports are shown in FIGS. 3 and 4 and can similarly be connected in FIG. 5. Similarly, conveyor belts such as conveyor belt 24 of FIG. 1 or those having additional surfaces for use on U-shaped carriers of FIGS. 3–5 are used.

FIG. 3 shows a further embodiment of the invention in which the trough belt conveyor comprises four-part U-shaped carriers. Two pairs of outer rollers 17 are connected by centrally disposed, driven carrier rollers 16, which at their outer ends are provided with a plugged-on motor 2 each. The pairs of outer rollers 17 rockers 15.

Another embodiment of the invention is shown in FIG. 4 and permits of handling material in a stream which is particularly large in cross-section. Five-part U-shaped carriers are incorporated in the conveyor. Two side rollers 8, which are aligned in a top plan view, are provided on each side, and these side rollers are connected by driven intermediate carrier rollers 7, which are combined in a rocker 6.

In the trough belt conveyor, the driving forces are frictionally applied to the conveyor belt in a tangential direction by a large number of U-shaped carriers comprising driven carrier rollers and impart a continuous, uniform advance to the belt.

Different from conventional trough belt conveyors, the spacing of the U-shaped carriers need not be selected with a view to the sag of the belt and similar factors but are calculated with consideration being given to the flexing strength, downward forces due to a slope, and the energy required in the respective belt portion.

In the arrangement according to the invention, the motor reaction torque of the driven rollers is taken up by rockers or double rollers which bear on the connveyor belt.

In one modification, the motor reaction torque is taken up in that the driven carrier rollers of two or more U-shaped carriers are interconnected by means by centrally disposed rods 18 or that a pivoted lever 19 is centrally mounted in each U-shaped carrier and a link 21 is connected between the end of each lever and a foundation 20.

The trough belt conveyor which has been described has the essential advantage that the tensile force and starting power are reduced as well as the initial resistance, particularly when the driving elements have been stuck or frozen, and that a satisfactory movement in curves is enabled. The use of centrally disposed, motor-driven rollers permits of a satisfactory guidance of the conveyor. The small tensile forces exerted on the belt enable the use of medium-strength belts in long-distance belts. This results in a high economy as the cost of the belt accounts for about 25% of the total costs of the plant. This could be offset by the extra cost involved in the individual drive units.

In view of the large number of driven carrying rollers, it will be required to supervise the individual drive units so as to make sure that all individual drive units are energized and effective or whether some are blocked or idle. An overload protection may also be required.

What is claimed is:

1. In a trough belt conveyor, a U-shaped carrier having supports between which the U-shaped carrier is supported, and a belt supported on said U-shaped carrier, said U-shaped carrier comprising
    roller means including carrier roller and side roller means,
    drive motor means connected to said carrier roller means and operable to drive the same and producing a reaction torque due to motor counter-torque,
    and said side roller means pivotally connected to said carrier roller means at each end of said carrier roller means thereof for supporting said carrier roller means,
    said roller means including reaction torque-resisting means for taking up said reaction torque in cooperation with said belt in contacting relation therewith.

2. A U-shaped carrier as set forth in claim 1, in which said drive motor means comprise plugged-on motor means.

3. A U-shaped carrier as set forth in claim 1, in which said drive motor means comprise drum motor means incorporated in said carrier roller means.

4. A U-shaped carrier as set forth in claim 1, in which said drive motor means comprise a motor shaft having a free end and
    a brake is mounted on said free end.

5. A U-shaped carrier in a trough belt conveyor as set forth in claim 1, further characterized by
    said roller means including at least one pair of rollers which form a rocker to bear on said belt to serve as said reaction torque-resisting means.

6. In a trough belt conveyor, a U-shaped carrier having supports between which the u-shaped carrier is supported, and a belt supported on said U-shaped carrier, said U-shaped carrier comprising
    roller means including carrier and side roller means,
    drive motor means connected to said carrier roller means and operable to drive the same and producing a reaction torque due to motor counter-torque,
    said side roller means connected to said carrier roller means at each end of said carrier roller means thereof,
    and reaction torque-resisting means for taking up said reaction torgue produced by said drive motor means including
    a lever which is pivoted to said roller means and has an end remote from said roller means,
    and a link pivoted to said end of said lever and adapted to be connected to a foundation adjacent to said carrier.

7. In a trough belt conveyor, in combination
    two spaced apart U-shaped carriers having supports between which the U-shaped carriers are supported, a belt supported on said U-shaped carrier, each of said carriers comprising intermediate carrier roller means, drive motor means connected to said carrier roller means and operable to drive the same and produce a reaction torque due to motor counter-torque, and a side roller means connected to said carrier roller means at each end thereof,
    and reaction torque-resisting means which serve to take up said reaction torque and comprise a linkage which is connected to both said carriers at the center thereof.

* * * * *